(12) United States Patent
Chene et al.

(10) Patent No.: US 9,014,757 B2
(45) Date of Patent: Apr. 21, 2015

(54) SYSTEM FOR COMMUNICATING IN A CONTACT-LESS MANNER, AND CORRESPONDING REMOVABLE CHIP CARD, TERMINAL AND METHOD

(75) Inventors: Gilles Chene, La Ciotat cedex (FR); Olivier Guichard, La Ciotat cedex (FR)

(73) Assignee: Gemalto SA, Meudon (FR)

( * ) Notice: Subject to any disclaimer, the term of this patent is extended or adjusted under 35 U.S.C. 154(b) by 192 days.

(21) Appl. No.: 13/991,127

(22) PCT Filed: Dec. 1, 2011

(86) PCT No.: PCT/EP2011/071524
§ 371 (c)(1),
(2), (4) Date: Jul. 30, 2013

(87) PCT Pub. No.: WO2012/072745
PCT Pub. Date: Jun. 7, 2012

(65) Prior Publication Data
US 2013/0303086 A1  Nov. 14, 2013

(30) Foreign Application Priority Data

Dec. 3, 2010  (EP) ..................................... 10306351

(51) Int. Cl.
*H04M 1/00* (2006.01)
*H04B 5/00* (2006.01)
(Continued)

(52) U.S. Cl.
CPC ............ *H04B 5/0025* (2013.01); *G06K 7/0008* (2013.01); *G06K 7/10237* (2013.01); *G06K 7/10297* (2013.01); *G07F 7/0893* (2013.01)

(58) Field of Classification Search
CPC ...................... H04M 2250/04; H04M 2250/14
USPC ........................ 455/41.1–41.3, 558
See application file for complete search history.

(56) References Cited

U.S. PATENT DOCUMENTS

| 2008/0144650 A1 | 6/2008 | Boch et al. |
| 2009/0275364 A1 | 11/2009 | Morel et al. |
| 2010/0029202 A1 | 2/2010 | Jolivet et al. |
| 2010/0210300 A1 | 8/2010 | Rizzo |
| 2011/0237190 A1 | 9/2011 | Jolivet |
| 2012/0052801 A1 | 3/2012 | Kulkarni |

FOREIGN PATENT DOCUMENTS

| EP | 2 251 986 A1 | 11/2010 |
| WO | WO 2008/114931 A1 | 9/2008 |
| WO | WO 2010/068016 A2 | 6/2010 |

OTHER PUBLICATIONS

International Search Report (PCT/ISA/210) issued on Apr. 2, 2012, by the European Patent Office as the International Searching Authority for International Application No. PCT/EP2011/071524.

(Continued)

*Primary Examiner* — Lee Nguyen
(74) *Attorney, Agent, or Firm* — Buchanan Ingersoll & Rooney PC

(57) ABSTRACT

A system for communicating via contact-less chip with an external contact-less communicating device comprises a removable chip card, a contact-less communicating chip and a terminal. The contact-less chip is carried by a flexible medium. A chip of the card is coupled, via a card connector, to the contact-less communicating chip, and a microprocessor of the terminal. The card chip is configured to act as an intermediary entity between the contact-less communicating chip and the terminal microprocessor. A card chip microprocessor exchanges data with the contact-less chip by using a first data communication protocol. The card chip microprocessor exchanges data with the terminal microprocessor by using a second data communication protocol. The terminal microprocessor is configured to send, through the card chip, to the contact-less communicating chip, data that is previously encapsulated within first communication protocol data that is itself encapsulated within second communication protocol data.

10 Claims, 2 Drawing Sheets

(51) Int. Cl.
*G06K 7/00* (2006.01)
*G06K 7/10* (2006.01)
*G07F 7/08* (2006.01)
*H04B 1/38* (2006.01)

(56) References Cited

OTHER PUBLICATIONS

European Search Report for EP 10306351 dated Jun. 15, 2011.

SYSTEM FOR COMMUNICATING IN A CONTACT-LESS MANNER, AND CORRESPONDING REMOVABLE CHIP CARD, TERMINAL AND METHOD

FIELD OF THE INVENTION

The invention relates, in a general manner, to a system for communicating in a contact-less manner.

Furthermore, the invention also pertains to a removable chip card for communicating in a contact-less manner.

Moreover, the invention concerns, as well, a terminal for communicating in a contact-less manner.

Finally, the invention relates, in a general manner, to a method for communicating in a contact-less manner.

Within the present description, the adjective "contact-less" used within the expression "contact-less manner" means notably that a device (as a communicating system) communicates, via a short range radio-frequency link, with an external device by using, for example, International Organization Standardization/International Electrotechnical Commission (or ISO/IEC) 14 443 specifications, a Ultra High Frequency RadioFrequency IDentification (or UHF RFID) technology or the like.

Likewise, the expression "a removable chip card" is a removable medium carrying an electronic object that is intended to communicate with the outside world.

STATE OF THE ART

A known solution for communicating in a contact-less manner is based upon a Near Field Communication (or NFC) enabled handset, such as a mobile telephone. The NFC enabled handset comprises an NFC chip soldered on its Printed Circuit Board (or PCB). The NFC chip is connected to, on the one hand, an antenna configured to exchange data, through a short range radio-frequency signal, with an external contact-less communicating device, and, on the other hand, a handset microprocessor.

However, if no NFC chip is soldered on the PCB handset, then the handset is not able to communicate data with an external contact-less communicating device.

Thus, there is a need to transform a handset, as user terminal, into an NFC enabled handset.

SUMMARY OF THE INVENTION

The invention proposes a solution for satisfying the just hereinabove specified need by providing a system for communicating in a contact-less manner. The system comprises a removable chip card, a contact-less communicating chip and a terminal.

According to the invention, the contact-less communicating chip being carried by a flexible medium, the chip of the card being coupled to, on the one hand, the contact-less communicating chip, and, on the other hand, a microprocessor of the terminal, the card chip is adapted to act as an intermediary entity between the contact-less communicating chip and the terminal microprocessor. And the terminal microprocessor is adapted to communicate, through the card chip, with the contact-less communicating chip.

The principle of the invention consists in a card chip that is connected to a contact-less communicating chip born by a flexible medium and a terminal microprocessor, so that the card chip is interposed in a communication between the contact-less communicating chip and the terminal microprocessor.

The card chip is used as a router and a proxy device that interfaces between the contact-less communicating chip and the terminal microprocessor. More exactly, the card chip receives data originating from the contact-less communicating chip and sends data to the terminal microprocessor and/or conversely, i.e. receives data originating from the terminal microprocessor and sends data to the contact-less communicating chip.

The terminal microprocessor communicates thus, through the card chip, with the contact-less communicating chip.

Due to an interconnection of the contact-less communicating chip with the card chip connected to the terminal microprocessor, the invention system allows to transform the terminal into a contact-less communicating terminal.

The invention system is therefore convenient for such a terminal user who does not need to acquire a terminal originally equipped with a contact-less communicating chip that is soldered on its PCB.

It is to be noted that contact-less communicating chip is not connected to the terminal microprocessor.

According to an additional aspect, the invention is a removable chip card for communicating in a contact-less manner. The chip of the card is likely to cooperate with a contact-less communicating chip and a terminal.

According to the invention, the contact-less communicating chip being carried by a flexible medium, the chip of the card being coupled to, on the one hand, the contact-less communicating chip, and on the other hand, a microprocessor of the terminal, the card chip is adapted to act as an intermediary entity between the contact-less communicating chip and the terminal microprocessor.

The card may have different form factors.

The card may be of different types, such as a Subscriber Identity Module (or SIM) type card, a Secure Digital (or SD) type card, a micro SD type card, a Multi-Media Card (or MMC) or other(s).

According to still an additional aspect, the invention is a terminal for communicating in a contact-less manner. The terminal is likely to cooperate with a contact-less communicating chip and a chip of a removable card.

According to the invention, the contact-less communicating chip being carried by a flexible medium, the chip of the card being coupled to, on the one hand, the contact-less communicating chip, and on the other hand, a microprocessor of the terminal, the terminal microprocessor is adapted to communicate, through the card chip, with the contact-less communicating chip.

As terminal, it may be, for example, a mobile telephone, a smart phone (i.e. a mobile phone with a Personal Digital Assistant (or PDA) capability), a set-top box, a Personal Computer (or PC), a tablet computer, a desktop computer, a laptop computer, an audio-player, a video-player, a media-player, a game console, a netbook and/or a PDA.

According to still an additional aspect, the invention is a method for communicating in a contact-less manner.

According to the invention, a contact-less communicating chip being carried by a flexible medium, a chip of the card being coupled to, on the one hand, the contact-less communicating chip, and, on the other hand, a microprocessor of a terminal, the contact-less communicating chip and the terminal microprocessor communicate through the card chip, as an intermediary entity.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered a smart card, as a removable chip card, coupled to a mobile telephone, as a terminal.

However, instead of a removable chip card, it may also be a dongle, as a removable chip medium.

Likewise, instead of a mobile telephone, as a terminal, it may be another user terminal, such as a smart phone, a set-top box, a PC, a tablet computer, a desktop computer, a laptop computer, an audio-player, a video-player, a media-player, a game console, a netbook and/or a PDA.

Naturally, the herein below described embodiment is only for exemplifying purposes and is not considered to reduce the scope of the present invention.

Figure 1:
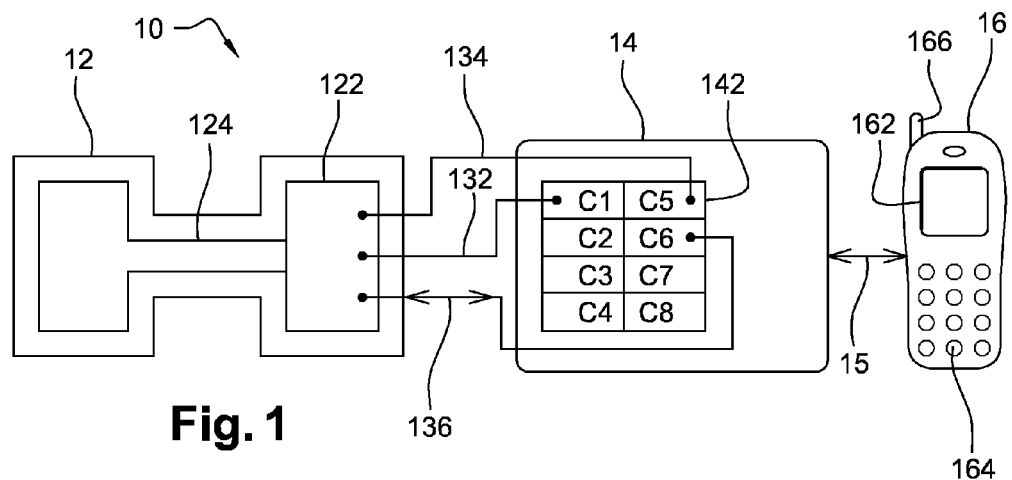
FIG. 1 illustrates a simplified diagram of one exemplary embodiment of a system comprising a medium with an NFC chip, as contact-less communicating chip, a removable chip card, and a mobile handset, as terminal, the system being adapted to communicate data in a contact-less manner while using the chip of the removable card, as an intermediary entity, in a data exchange between the terminal and the NFC chip, according to the invention.

FIG. 1 shows schematically a system 10 for communicating in a contact-less manner.

The system 10, as an NFC enabled terminal, includes a flexible tape 12 which carries an NFC chip 122, a Subscriber Identity Module (or SIM) type card 14 and a mobile telephone 16, as terminal.

For a sake of clarity and conciseness, the NFC chip 122, the SIM type card 14, the mobile telephone 16 are termed hereinafter the CLF (acronym for "Contact-Less Front-end") 122, the card 14 and the phone 16 respectively.

A housing of the phone 16 contains, among others, a battery (not represented), electronic components relating to the phone 16, the flexible tape 12, as an add-on removable element, and the card 14.

The flexible tape 12 is constituted by an insulating material, such as a plastic material.

The flexible tape 12 carries the CLF 122, one connector (not represented), and preferably a short-range antenna 124.

The connector of the flexible tape 12 is inserted between a corresponding card connector 142 and a corresponding phone 16 connector (not represented) with eight electrical contacts termed C1 to C8. The connector of the flexible tape 12 is thus sandwiched between the card connector 142 and the phone 16 connector.

A first side of the connector of the flexible tape 12 is provided with eight contacts that are compliant with the International Organization Standardization (or ISO) 7816, namely C1, for a supplying signal (or Vcc), C2, for a ReSeT (or RST) signal, C3 for a CLocK (or CLK) signal, C4 for a Reserved Future Use (or RFU), C5, for a ground signal (or GND), C6, for another supplying signal (or Vpp), C7 for an Input/Output (or I/O) signal, and C8 for RFU. Among the eight contacts, only four contacts, namely C2, C3, C5, and C7 are connected, via four corresponding holes filled with electrically conductive material, to corresponding ISO 7816 contacts of a second side of the connector of the flexible tape 12.

The second side of the connector of the flexible tape 12 is connected to the card connector 142 to corresponding ISO 7816 contacts, through a first link 132, namely C1, and a second link 134, namely C5, and, through a third bi-directional link 136, such as a Single Wire Protocol (or SWP) link, namely C6. The other five ISO 7816 contacts, namely C2, C3, C4, C7 and C8 of the second side of the connector of the flexible tape 12 are insulated, i.e. are not connected, with respect to the CLF 122.

The CLF 122 is connected, through the three links 132, 134 and 136 of the first side of the connector of the flexible tape 12, to a chip carried by the card 14, as chip medium.

Thus, the phone 16 connector is connected, through the connector of the flexible tape, to the card connector 142, for only four signals, namely the RST, the CLK, the GND and the I/O signal.

The CLF 122 is insulated from a phone 16 I/O interface (not represented) and therefore not connected to a phone microprocessor (not represented).

According to another embodiment (not represented), instead of being carried by a single medium, the CLF 122, the connector, and the short-range radio antenna 124 are carried by two distinct and separate media. The CLF 122 and the connector are carried by a medium while the short-range radio antenna 124 is carried by another medium. The short-range radio antenna 124 is connected to the CLF 122 through either the connector or another connector.

The CLF 122 includes, in particular, a microprocessor(s) (not represented), as means for processing data, one memory(ies) (not represented), as means for storing data, and at least one I/O interface (not represented) for exchanging data with the outside world, which are internally linked together through a data and control bus (not represented).

The CLF 122 is connected to the short-range antenna 124.

The short-range antenna 124 is configured, so as to exchange, through a short-range radiofrequency link, with an external entity, data transported by a short-range radio-frequency signal.

The short range radiofrequency is, for example, 13.56 MHz.

The CLF 122 is adapted to control a powering of the card 14 chip.

In a reader mode, i.e. when the system 10 also powers an external Contact-Less communicating Device (not represented) (or CLD), the CLF 122 receives power from the phone 16 battery, the CLF 122 powers the CLD by sending a short range radio-frequency signal. The card 14 chip and the electronic components of the phone 16 are powered by the phone 16 battery.

In a card emulation mode (or transponder mode), i.e. when the system 10 is powered at least in part by an external Contact-Less communicating Reader (or CLR) (not represented), the CLF 122 receives power from the CLR and provides power only, through the first and second links 132, 134, to the card 14 chip. The electronic components relating to the phone 16 are powered by the phone 16 battery.

In both modes, namely in the reader mode and in the card emulation mode, the CLF 122 communicates only with the card 14 chip, as its single interlocutory, through the third link 136. The CLF 122 exchanges with the card 14 chip by implementing a protocol of the Host Controller Interface (or HCI) type, as high level protocol, i.e. a protocol used for exchanging from an application run by the CLF microprocessor to an application run by a card 14 microprocessor (not represented).

The application run by the card 14 microprocessor may be written in an object-oriented language, such as Java or Javacard, also termed applet when developed in Java.

The CLF 122 plays a role of a modulator-demodulator (or modem) for the system 10, i.e. a device that may:

modulate an analogical carrier signal to encode digital information received from the card 14 to be transmitted, over the short-range antenna 124, to an external contact-less communicating device (not represented); and/or demodulate a received analogical carrier signal to decode encoded digital information that is received, over the short-range antenna 124, from an external contact-less communicating device (not represented).

The system 10 is adapted to communicate, in a contact-less manner, with an external contact-less communicating device.

The external contact-less communicating device may be either a CLR or a CLD.

The CLD may be an RFID tag that stores data, such as an Uniform Resource Identifier (or URI), an Uniform Resource Locator(s) (or URL), an Internet Protocol (or IP) address and/or a phone number.

The card 14 is coupled to, on a first side, the CLF 122, and, on a second side, the phone 16 microprocessor.

The card 14 is a SIM type card (not represented), such as a SIM card, a UICC (acronym for "Universal Integrated Circuit Card") card, a CSIM (for "CDMA Subscriber Identity Module") card, a USIM (for "Universal Subscriber Identity Module") card, a RUIM (for "Removable User Identification Module") card, an ISIM (for "Internet protocol multimedia Services Identity Module") card and/or the like.

The card 14 incorporates an Integrated Circuit (or IC) or chip (not represented).

According to one important feature of the invention, the card 14 chip is adapted to act as an intermediary entity between the CLF 122 and the phone 16 microprocessor.

The card 14 chip comprises at least one microprocessor (not represented), as data processing means, at least one memory (not represented), as data storing means, and at least two I/O interfaces (not represented) for communicating with the exterior of the card 14 chip, which are all linked together through a control and data bus.

The card 14 chip I/O interfaces are used for receiving data from and sending data to outside, notably, through the CLF I/O interface, with the CLF 122 and, through a phone I/O interface, with the phone 16.

A first card 14 chip I/O interface includes an I/O interface over a SWP using preferably an HCI, as high level protocol, i.e. a protocol used for exchanging between an application run by the card 14 chip microprocessor and an application run by the CLF 122.

A second card 14 chip I/O interface includes an ISO 7816 type interface using preferably an Application Protocol Data Unit (or APDU) type protocol, as high level protocol, i.e. a protocol used for exchanging between an application run by the card 14 chip microprocessor and an application run by the phone 16 microprocessor.

Alternately, instead of an APDU type protocol, the second card I/O interface may include an Internet Protocol (or IP) type interface, a Mass Storage type interface, a Universal Serial Bus (or USB) type interface, a Secure Digital (or SD) type interface, a Multi-Media Card (or MMC) type interface, so as to let communicate the card 14 microprocessor and the phone 16 microprocessor.

The card 14 chip memory can be constituted by one or several EEPROM (for "Electrically Erasable Programmable Read-Only Memory"), one or several ROM (for "Read Only Memory"), one or several Flash memories, and/or any other memory(ies) of different types, like one or several RAM (for "Random Access Memory").

The card 14 chip memory stores, preferably in a secure manner, data relating to a user, such as an identifier relating to a card user, like an International Mobile Subscriber Identity (or IMSI), an encryption algorithm, a decryption algorithm, a private key allowing the user to securely exchange data with an entity that is external to the card 14, and/or a public key associated with the private key. The private key is used for encrypting data to be exchanged with the external entity.

The card 14 chip memory stores preferably, besides an Operating System (or OS), at least one application, termed proxy application, accessible through the CLF 122 and the phone 16 microprocessor.

According to such a corresponding embodiment, the card 14 chip memory stores a JVM that interprets and executes the proxy application.

The proxy application allows, when executed by the card 14 microprocessor, to discuss, on the hand, with the CLF 122 and, on the other hand, with the phone 16 microprocessor, so as to let communicate the CLF 122 and the phone 16 microprocessor.

The card 14 chip microprocessor controls and communicates with all the components of the card 14 chip, such as the card 14 chip memory to read it and/or write into it.

The card 14 chip microprocessor controls a data exchange, through the card 14 I/O interface, with outside of the card 14 chip, notably the phone 16 and the CLF 122.

The card 14 chip microprocessor executes preferentially, besides the OS, the proxy application for exchanging data, on the one hand, with the CLF 122 by using a first data communication protocol and, on the other hand, with the phone 16 by using a second data communication protocol.

The proxy application is able to convert data transmitted with the first data communication protocol and originating from the CLF 122 into data to be transmitted with the second data communication protocol and intended to the phone 16 microprocessor.

Conversely, the proxy application is able to convert data transmitted with the second data communication protocol and originating from the phone 16 microprocessor into data to be transmitted with the first data communication protocol and intended to the CLF 122.

The phone 16 includes at least one microprocessor (not represented), at least one memory (not represented) and at least one I/O interface (not represented).

The phone I/O interface includes an I/O interface for exchanging data, via a bi-directional contact link 15, through a corresponding card I/O interface, with the card 14 microprocessor.

The phone I/O interface may comprise a radio interface for exchanging, through an antenna 166, data with a mobile radio-communication network (not represented).

The phone I/O interface comprises preferably a display screen 162, a keyboard 164, and a phone loudspeaker (not represented), as Man Machine Interface (or MMI).

The phone microprocessor processes data originating from and/or intended to any internal component and data originating from and/or any external device through the phone I/O interface.

The phone 16 microprocessor executes, besides an OS, an NFC application(s) supported by the phone 16, so as to offer to the phone user corresponding NFC service(s).

The NFC service(s) may encompass a transport service(s), a wallet service(s), a mobile banking service(s), and/or any other service accessible through an NFC type communication technology.

According to an important feature of the invention, the phone 16 microprocessor is adapted to communicate, through the card 14 chip, with the CLF 122.

The phone 16 microprocessor executes an application, termed exchange application, for exchanging data, through the card 14 chip, with the CLF 122.

According to such a corresponding embodiment, the phone 16 memory stores a JVM that interprets and executes the exchange application.

The phone 16 memory stores, besides an OS, the NFC application(s) and the exchange application.

The exchange application may allow sending, through the card 14 chip, to the CLF 122 data, in particular one command(s) for administrating the CLF 122, such as a command for configuring at least one radio-frequency parameter of the CLF 122. The command may constitute notably a command for switching on or off a type, like type A or type B. To switch from one current type to the other type, for example, the exchange application allows sending, through the card 14 chip, to the CLF 122, a first command for switching off the current type followed by a second command for switching on the other type.

The exchange application allows sending, through the card 14 chip, to the CLF 122 data, in particular one command(s), that is previously encapsulated within the first communication protocol data, itself being encapsulated within the second communication protocol data.

The exchange application may allow reading data originating from the external of the system 10 and received by the CLF 122 by addressing, through the card 14 chip, to the CLF 122.

The exchange application may allow accessing, thanks to data originating from the external of the system 10 and received by the CLF 122, the phone 16 MMI, so as to exchange with a phone 16 user, while addressing, from the CLF 122, through the card 14 chip, to the phone 16 microprocessor.

Figure 2:
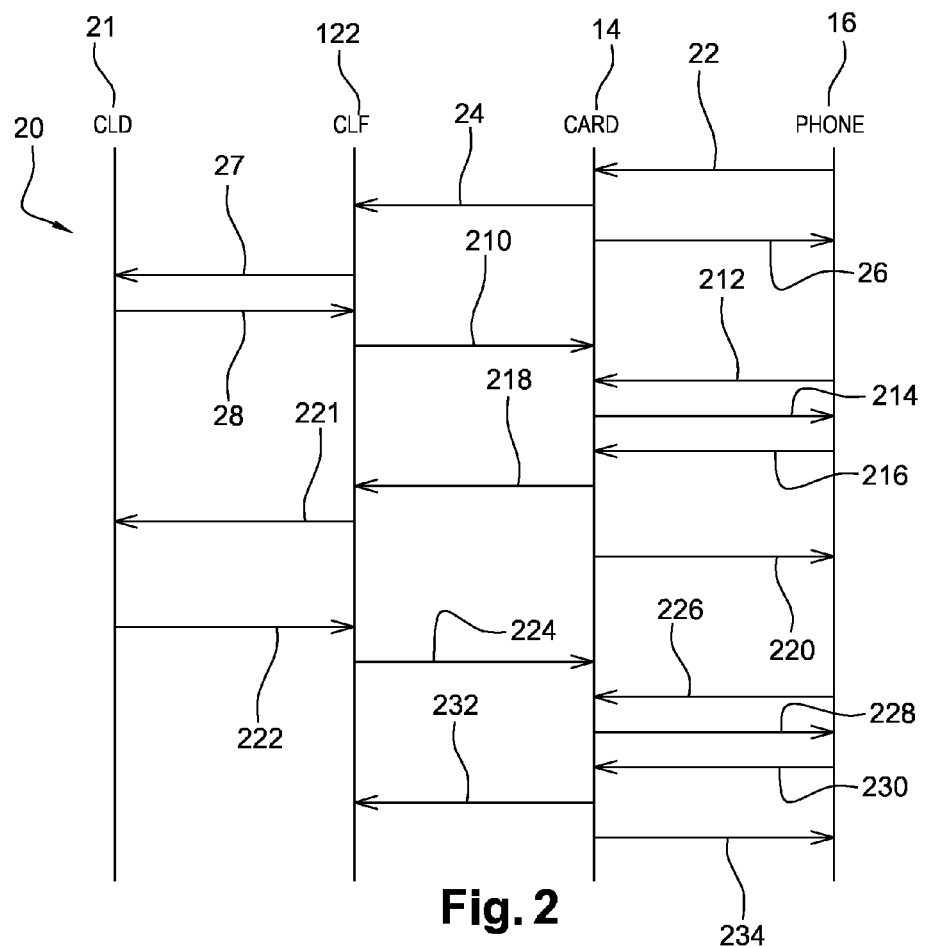
FIG. 2 represents an example of a flow of messages exchanged between the NFC chip, the chip of the removable card and a microprocessor of the terminal of the system of FIG. 1 and a contact-less communicating device, so that the system is able to operate in a reader mode.

FIG. 2 depicts an example of a message flow 20 that involves a Contact-Less communicating Device (or CLD) 21, the CLF 122, the card 14 chip, and the phone 16 microprocessor, when the system 10 operates in a reader mode with respect to the CLD 21.

The card 14 chip (and more exactly the proxy application) constitutes, within the system 10, the single interlocutory of the phone 16 microprocessor (and more exactly the exchange application) and also the single interlocutory of the CLF 122.

The card 14 chip plays a role of a proxy gate.

The phone 16 microprocessor acts as a reader application gate that accesses only the card 14 chip. The phone 16 microprocessor sends to the card 14 chip a set of commands. The card 14 chip sends back to the terminal a set of corresponding responses, as further described herein below. The commands and responses are compliant with the European Telecommunications Standards Institute (or ETSI) 102.622 specifications, so as to discuss by using HCI protocol.

The CLF 122, as host controller, plays a role of a radio-frequency reader gate, accessible only from the card 14 chip within the system 10.

The card 14 chip sends to the CLF 122 a set of commands. The CLF 122 sends back to the card 14 chip a set of corresponding responses, as further described herein below. The commands and responses exchanged between the card 14 chip and the CLF 122 are compliant with the ETSI 102.622 specifications.

Firstly, a phone user activates a reader mode of the system 10, for example, by depressing at least one button of the keyboard 164.

The phone 16 microprocessor sends to the card 14 chip a first phone command 22, such as "APDU_WRITE[HCI (EVT_READER_REQUESTED)]". The first phone command 22 is built by encapsulating a CLF command, such as EVT_READER_REQUESTED, intended to the CLF 122, within a first protocol data, namely HCI data, the encapsulated CLF command being encapsulated within a second protocol data, such as APDU data, such as APDU_WRITE, as a phone command. The first phone command 22 may include, besides the CLF command, CLF parameters, so as to set the CLF 122 in a desired type A or B.

The first phone command 22 allows addressing, from the phone 16 microprocessor, through the card 14 chip, to the CLF 122, so as to set the CLF 122 in a reader mode.

The card 14 chip extracts or de-encapsulates the received first phone command 22, so as to retrieve a first card command to be sent to the CLF 122. Then, the card chip sends to the CLF 122 the first card command 24, such as HCI (EVT_READER_REQUESTED), as a CLF command intended to the CLF 122 while being encapsulated within the first protocol data.

The card 14 chip sends back to the phone 16 microprocessor a first card response 26, as response to the first phone command 22, such as an APDU status word like 9000 without data. The first card response 26 allows telling to the phone 16 microprocessor that the card 14 has well received the first phone command 22.

Then, during a polling phase (not represented), the phone 16 microprocessor sends periodically to the card 14 chip an additional phone command (not represented), such as APDU_READ, so as to request to the card 14 chip whether the card 14 chip has some data to give to the phone 16 microprocessor. The period may be set to 1 s (or second). While the card 14 chip has no data to give to the phone 16 microprocessor, the card 14 chip sends back to the phone 16 microprocessor a card response, as response to each additional phone command, like an APDU status word, like "9000", without data. Such a card response allows telling to the phone 16 microprocessor that the card 14 has well received the additional phone command, but the card 14 chip has no data to provide to the phone 16 microprocessor.

Once the CLF 122 receives the first card command 24, the CLF 122 executes it and is thus configured according to an operating mode, such as on a type A or type B.

Then, the CLF 122 sends an interrogating signal 27, so as to power, thanks to the phone battery, any contact-less communicating device that is close (typically up to 20 cm) to the system 10, as a contact-less communicating reader.

As soon as, for example, an RFID tag, as CLD 21, has been powered, the CLD 21 sends to the system 10 a presence signal 28, so as to indicate its presence in an electromagnetic field generated by the CLF 122.

Once the CLF 122 has received the presence signal 28, the CLF 122 sends to the card 14 chip data, such as EVT_TARGET_DISCOVERED, for signalling this latter that an interlocutory has been detected, encapsulated within first protocol data, namely HCI data, such as HCI(EVT_TARGET_DISCOVERED), as response 210 to the first card command 24.

The phone 16 microprocessor sends to the card 14 chip a second phone command 212, such as APDU_READ, so as to request the card 14 chip whether the card 14 chip has some data to give to the phone 16 microprocessor.

Once the card 14 chip has received the response 210 to the first card command 24, the card 14 chip encapsulates the received response into a second protocol data, namely APDU. Then, the card 14 chip sends to the phone 16 microprocessor the resulting encapsulated response 214, such as APDU[HCI (EVT_TARGET_DISCOVERED)], accompanied with an APDU status word, as response to the second phone command 212. The response 214 to the second phone command 212 allows informing the phone 16 microprocessor that an interlocutory has been detected, and the card 14 chip has well received from the phone 16 microprocessor the second phone command 212.

The phone 16 microprocessor receives and interprets the response 214 to the second phone command 212.

Then, the phone 16 microprocessor builds a third phone command comprising a reading command, such as WR_X-CHG_DATA, so as to read data originating from the CLD 21, as interlocutory of the CLF 122.

To build the third phone command, firstly, the phone 16 microprocessor encapsulates the reading CLF command intended to the CLF 122 within first protocol data, namely HCI data, and, then, the phone 16 microprocessor encapsulates the encapsulated reading CLF command within second protocol data, namely APDU data.

Once built, the phone 16 microprocessor sends to the card 14 chip the resulting third phone command 216, such as APDU_WRITE[HCI(WR_XCHG_DATA)].

The card 14 chip extracts or de-encapsulates the received third phone command 216, so as to retrieve a corresponding card command to be sent to the CLF 122. Then, the card 14 chip sends to the CLF 122 a second card command 218, such as HCI(WR_XCHG_DATA), as a CLF command intended to the CLF 122 while being encapsulated within the first protocol data, namely HCI data.

Then, the CLF 122 receives the second card command 218 and extracts from this latter the reading command, namely WR_XCHG_DATA, as CLF command originating from the phone 16 microprocessor.

The CLF 122 executes the reading command by sending to the CLD 21 a command 221 for fetching data.

The CLD 21 retrieves data stored within the CLD 21 and sends back to the CLF 122 the retrieved data 222.

Then, the CLF 122 sends back to the card 14 chip a response 224 to the second card command 218. The response 224 comprises the read data.

Meanwhile, during another polling phase (not represented), the phone 16 microprocessor sends periodically to the card 14 chip an additional phone command (not represented), such as APDU_READ, so as to request the card 14 chip whether the card 14 chip has some data to give to the phone 16 microprocessor.

The phone 16 microprocessor sends to the card 14 chip a fourth phone command 226, such as APDU_READ, for requesting the card 14 chip to transfer data to the phone 16 microprocessor.

Once the card 14 chip has received the response 224 to the second card command 218, the card 14 chip encapsulates the received response into a second protocol data, namely APDU. Then, the card 14 chip sends to the phone 16 microprocessor the resulting encapsulated response 228, such as APDU[HCI (WR_XCHG_DATA)], accompanied with an APDU status word, such as "9000", as response to the fourth phone command 226. The response 228 to the fourth phone command 226 allows informing the phone 16 microprocessor that an interlocutory has provided the CLF 122 with read data that is attached and the card 14 chip has well received from the phone 16 microprocessor the fourth phone command 226.

Then, the phone 16 microprocessor receives the read data within the response 228 to the fourth phone command by extracting the read data.

The phone 16 microprocessor processes the read data.

Optionally, the phone 16 microprocessor informs, through the phone MMI, the phone user about either the read data or data derived from the read data.

The phone 16 microprocessor sends to the card 14 chip a fifth phone command 230, such as "APDU_WRITE[HCI (EVT_END_OPERATION)]". The fifth phone command 230 is built by encapsulating a CLF command, such as EVT_END_OPERATION, intended to the CLF 122, within a first protocol data, namely HCI data, the encapsulated command being encapsulated within a second protocol data, such as APDU data, such as APDU_WRITE, as a phone command. The CLF command allows the CLF 122 to close the open reading session.

Then, the card 14 chip sends to the CLF 122 a third card command 232, after having de-encapsulated the fifth phone command 230 and extracted the third card command.

The card 14 chip sends back to the phone 16 microprocessor a fifth card response 234, as response to the fifth phone command 230, such as an APDU status word, like "9000" without data. The fifth card response 234 allows telling to the phone 16 microprocessor that the card 14 has well received the last phone command 230.

The CLF 122 closes the open reading session.

Figure 3:
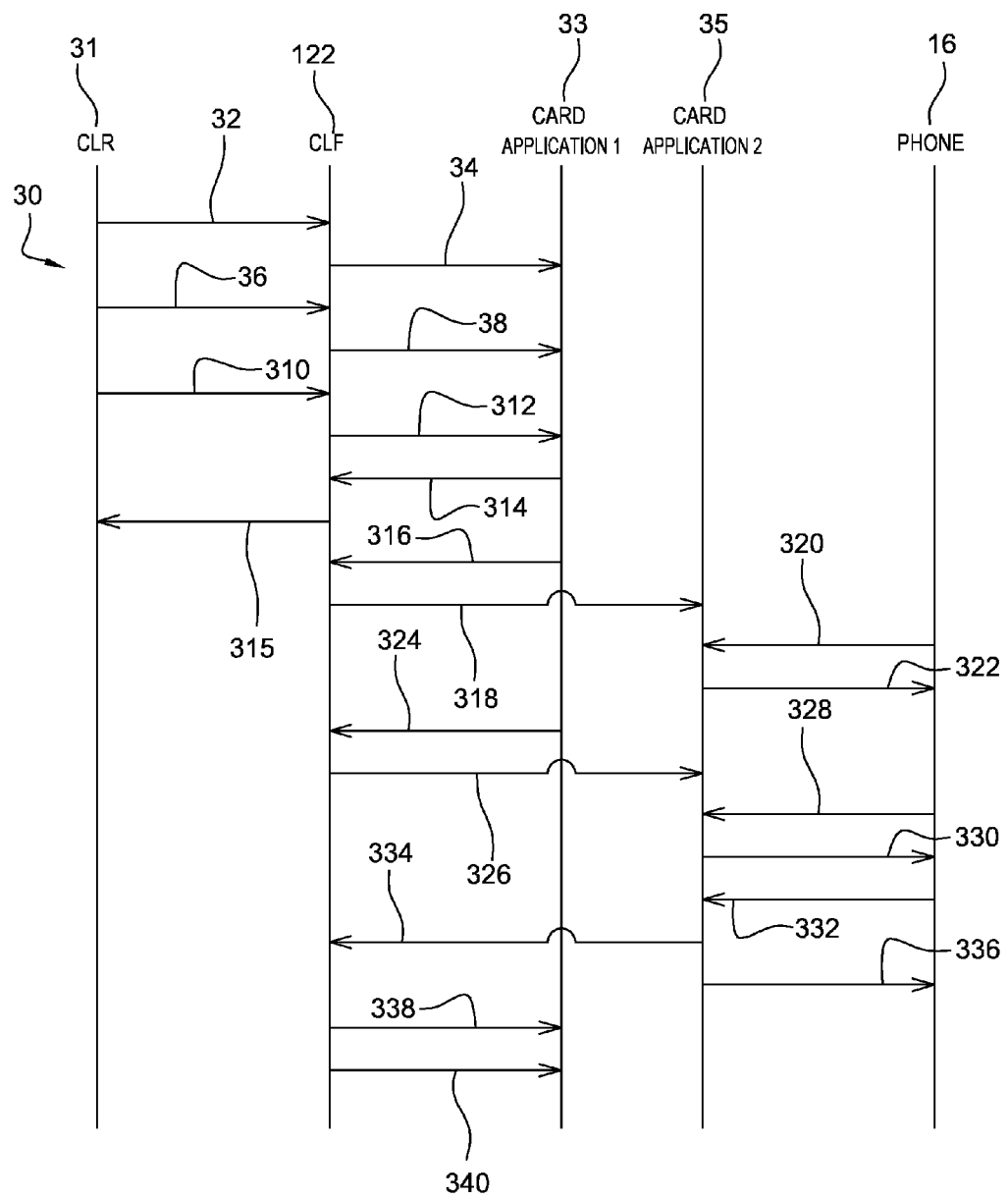
FIG. 3 is an example of a flow of messages exchanged between the NFC chip, the chip of the removable card and a microprocessor of the terminal of the system of FIG. 1 and a contact-less communicating device, as a contact-less reader, so that the system is able to operate in a card-emulation mode.

FIG. 3 shows an example of a message flow 30 that involves a Contact-Less communicating Reader (or CLR) 31, as a Contact-Less communicating Device external to the system 10, the CLF 122, the card 14, and the phone 16 microprocessor, when the system 10 operates in a card emulation mode with respect to the CLR 31.

In the embodiment described herein after, the card 14 chip executes two applications 33 and 35, termed card application 1 and card application 2 respectively in the FIG. 3, in which the card application 2 is the proxy application that interfaces with, on the one hand, the CLF 122, and, on the other hand, the phone 16 microprocessor.

The card 14 chip (and more exactly the proxy application) constitutes, within the system 10, the single interlocutory of the phone 16 microprocessor (and more exactly the phone application) and also the single interlocutory of the CLF 122.

The card 14 chip plays a role of a card application gate/connectivity gate and a proxy gate.

The phone 16 microprocessor acts as a connectivity gate that accesses only the card 14 chip (and more exactly the proxy application). The phone 16 microprocessor sends to the card 14 chip a set of commands. The card 14 chip sends back to the terminal a set of corresponding responses, as further described herein below.

The CLF 122, as host controller, plays a role of a card radio-frequency gate, accessible only from the card 14 chip (and more exactly the two applications) within the system 10.

The card 14 chip sends to the CLF 122 a set of commands. The CLF 122 sends back to the card 14 chip a set of corresponding responses, as further described herein below. The commands and responses are compliant with the ETSI 102.622 specifications, so as to discuss by using the HCI protocol.

Firstly, a phone user switches on the phone 16 that is thus powered by the phone battery.

The CLR 31 sends an interrogating signal 32, so as to power, thanks to the interrogating signal, at least in part any contact-less communicating device or system 10 that is close (typically up to 20 cm) to the CLR 31.

The interrogating signal 32 is thus received by the CLF 122. The interrogating signal 32 allows powering the CLF 122 and the card 14 chip.

The CLF 122 sends, to the card application 1 33, data 34, such as EVT_FIELD_ON, encapsulated within first protocol data, namely HCI, for informing the card 14 chip that the system 10 is present within an electromagnetic field generated by the CLR 31.

The CLR 31 sends to the CLF 122 a signal 36, so as to allow selecting the CLF 122 among several contact-less communicating device(s) and/or system(s) comprised within the electromagnetic field generated by the CLR 31. Such a selection enables to avoid collision during data exchange between the CLR 31 and different contact-less communicating device(s) and/or system(s).

Then, the CLF 122 sends, to the card application 1 33, data 38, such as EVT_CARD_ACTIVATED, encapsulated within first protocol data, namely HCI, for activating the card 14 chip that the system 10 is selected for exchanging data with the CLR 31.

The card application 1 33 receives the data 38 originating from the CLF 122 and is activated.

Once the CLR 31 has activated the system 10, the CLR 31 sends to the CLF 122 data 310, like, for example, a request for decrementing a value of a counter that manages a transport service, also termed ticketing service.

The CLF 122 sends, to the card application 1 33, data 312, such as EVT_SEND_DATA, encapsulated within first protocol data, namely HCI, for requesting the card 14 chip to process the data originating from the CLR 31.

Then, the card application 1 33 processes the received data by, for example, decrementing a counter value managed by the card 14 chip.

Once the card application 1 33 has processed the data originating from the CLR 31, the card application 1 33 sends back to the CLF 122 data 314, such as EVT_SEND_DATA, encapsulated within first protocol data, namely HCI, for informing the CLR 31 that the data (sent by the CLR 31) has been processed while possibly accompanying it with data resulting from the data processing by the card 14 chip.

The CLF 122 sends to the CLR 31 data 315, such as the data resulting from the data processing by the card 14 chip and/or a simple acknowledgement of the receipt of the data originating from the CLR 31.

The card application 1 33 sends to the CLF 122 data 316, such as EVT_CONNECTIVITY, encapsulated within first protocol data, namely HCI, for informing the card application 2 that the data is to be transferred to the phone 16 microprocessor. Thus, a channel or pipe, termed "connectivity" pipe, between the card application 1 33 and the phone 16 microprocessor is to be created through the card application 2 35. The connectivity pipe may be used for exchanging with the phone user through the phone MMI.

Then, the CLF 122 forwards data 318, namely HCI(EVT_CONNECTIVITY), that has just been received from the card application 1 33 to the card application 2 35.

Thus, the CLF 122 is a bridge between two applications executed by the card 14 chip that allows re-directing data originating from the card application 1 33 to the card application 2 35.

According to an alternative, the card application 1 33 sends data to the card application 2 35 without interposing any entity external to the card 14 chip. According to such an alternative, the exchanged messages with the different involved actors are thus reduced.

Meanwhile, during a polling phase (not represented) from a power-on of the phone 16, the phone 16 microprocessor sends periodically to the card 14 chip a phone command (not represented), such as APDU_READ, so as to request the card 14 chip whether the card 14 chip has some data to give to the phone 16 microprocessor. The period may be set to 1 s (or second). While the card 14 chip has no data to give to the phone 16 microprocessor, the card 14 chip sends back to the phone 16 microprocessor a card response, as response to each phone command, like an APDU status word like 9000 without data. Such a card response allows telling to the phone 16 microprocessor that the card 14 has well received the additional phone command but the card 14 chip has no data to provide to the phone 16 microprocessor.

The phone 16 microprocessor sends to the card 14 chip a first phone command 320, such as APDU_READ, for requesting the card 14 chip to transfer to the phone 16 microprocessor data.

Once the card application 2 35 has received from the card application 1 33 data previously received, namely HCI(EVT_CONNECTIVITY), the card application 2 35 encapsulates the received data into a second protocol data, namely APDU. Then, the card application 2 35 sends to the phone 16 microprocessor resulting encapsulated data, such as APDU[HCI(EVT_CONNECTIVITY)], accompanied with an APDU status word, as first response 322 to the first phone command 320. The first response 322 to the first phone command 320 may allow informing the phone 16 microprocessor that the card 14 chip processes data, for example, by using the phone MMI to exchange with the phone user, and the card 14 chip has well received from the phone 16 microprocessor the first phone command 320.

Optionally, the card application 1 33 sends to the CLF 122 data 324, such as EVT_TRANSACTION, encapsulated within first protocol data, namely HCI, that is to be addressed, through the card application 2 35, to the phone 16 microprocessor by using the created "connectivity" pipe, between the card application 1 33 and the phone 16 microprocessor. Then, the CLF 122 forwards data 326, namely HCI(EVT_TRANSACTION), that has just been received from the card application 1 33 to the card application 2 35.

The phone 16 microprocessor sends to the card 14 chip a second phone command 328, such as APDU_READ, for requesting the card 14 chip to transfer to the phone 16 microprocessor data available at the card 14 chip.

Once the card application 2 35 has received, through the CLF 122, from the card application 1 33 data previously received, namely HCI(EVT_TRANSACTION), the card application 2 35 encapsulates the received data into a second protocol data, namely APDU.

The card application 2 35 sends to the phone 16 microprocessor resulting encapsulated data 330, such as APDU[HCI(EVT_TRANSACTION)], accompanied with an APDU status word, as second response 330 to the second phone command 328. The second response 330 to the second phone command 328 may allow informing the phone 16 microprocessor that the card 14 chip needs data from the phone user. For example, the needed data involves an exchange, through the phone MMI, by asking one question to the phone user. The second response 330 to the second phone command 328 allows informing that the card 14 chip has well received from the phone 16 microprocessor the second phone command 328.

The phone 16 microprocessor sends to the card application 2, a third phone command 332, such as "APDU_WRITE[HCI(EVT_TRANSACTION)]". The third phone command 332 is built by encapsulating a card command, such as EVT- _TRANSACTION, intended to the card application 1 33, within a first protocol data, namely HCI data, the encapsulated command being encapsulated within a second protocol data, such as APDU data, such as APDU_WRITE, as a phone command.

The card command allows the card application 1, for example, to get from the phone user a response to an asked question. The card command encompasses the response.

The card application 2 sends to the CLF 122 a card command 334, such as EVT_TRANSACTION, encapsulated within first protocol data, namely HCI, after having de-encapsulated the third phone command 332 and extracted the card command 334.

The card 14 chip sends back to the phone 16 microprocessor a third card response 336, as response to the third phone command 332, such as an APDU status word, like "9000", without data. The third card response 336 allows telling to the phone 16 microprocessor that the card 14 has well received the last phone command 332.

The CLF 122 receives the card command 334 and sends to the card application 1 33 the received card command 338, namely HCI(EVT_TRANSACTION).

The card application 1 33 processes the received card command 338 by exploiting the data originating from the phone 16 microprocessor.

The phone user moves away from the CLR 31.

The CLF 122 does no more receive any signal issued by the CLR 31.

The CLF 122 sends to the card application 1 data 340, such as EVT_FIELD_OFF, encapsulated within first protocol data, namely HCI, for informing the card 14 chip that the open card emulation session is terminated.

A lot of amendments for the embodiment described supra in relation with the operating either in a reader mode or in a card emulation mode may be brought without departing from the spirit of the invention. For example, instead of an execution of two applications (or applets) by the card 14 chip for the card emulation mode in which one application discusses with the CLF 122 while another application discusses with the phone 16 microprocessor, the card 14 chip executes one and the same application that integrates functions carried out by the two applications.

The invention claimed is:

1. A system for communicating via a contact-less communicating chip with an external contact-less communicating device, the system comprising a removable chip card, a contact-less communicating chip and a terminal wherein,
    the contact-less communicating chip is carried by a flexible medium,
    a chip of the card is coupled, via a card connector, to the contact-less communicating chip, and a microprocessor of the terminal,
    the card chip is configured to act as an intermediary entity between the contact-less communicating chip and the terminal microprocessor,
    a card chip microprocessor exchanges data with the contact-less chip by using a first data communication protocol,
    the card chip microprocessor exchanges data with the terminal microprocessor by using a second data communication protocol, and
    the terminal microprocessor is configured to send, through the card chip, to the contact-less communicating chip, data that is previously encapsulated within first communication protocol data that is itself encapsulated within second communication protocol data.

2. System according to claim 1, wherein the terminal comprises means for configuring, through the card chip, at least one radiofrequency parameter of the contact-less communicating chip.

3. System according to claim 1, wherein the terminal comprises means for reading, through the card chip, data originating from the contact-less communicating chip.

4. System according to claim 1, wherein the terminal comprises means for encapsulating at least one command directed to the contact-less communicating chip within first communication protocol data, the first communication protocol data being encapsulated within second communication protocol data.

5. System according to claim 1, wherein the first communication protocol includes a protocol relating to a Host Controller Interface and wherein the second communication protocol includes a protocol relating to an Application Protocol Data Unit.

6. System according to claim 1, wherein the contact-less communicating chip includes a Near Field Communication type chip, wherein the removable chip card includes a Subscriber Identity Module type card and wherein the terminal includes a mobile handset.

7. System according to claim 6, wherein the Subscriber Identity Module type card is connected, through a Single Wire Protocol link, to the Near Field Communication type chip and wherein the Subscriber Identity Module type card is connected, through a International Organization for Standardization link, to the terminal.

8. A removable chip card for communicating via a contact-less communicating chip with an external contact-less communicating device, wherein,
    the contact-less communicating chip is carried by a flexible medium,
    a chip of the card is coupled, via a card connector, to the contact-less communicating chip, and a microprocessor of a terminal,
    the card chip is configured to act as an intermediary entity between the contact-less communicating chip and the terminal microprocessor,
    a card chip microprocessor exchanges data with the contact-less chip by using a first data communication protocol,
    the card chip microprocessor exchanges data with the terminal microprocessor by using a second data communication protocol, and
    the card chip microprocessor is configured to receive data that is previously encapsulated within first communication protocol data that is itself encapsulated within second communication protocol data.

9. A terminal for communicating, through a chip of a removable card, via a contact-less communicating chip with an external contact-less communicating device, wherein,
    the contact-less communicating chip is carried by a flexible medium,
    the chip of the card is coupled, via a card connector, to the contact-less communicating chip, and a microprocessor of the terminal, and
    the terminal microprocessor is configured to send, through the card chip, to the contact-less communicating chip data that is previously encapsulated within first communication protocol data that is itself encapsulated within second communication protocol data.

10. A method for communicating in a contact-less manner with an external contact-less communicating device,
    wherein, a contact-less communicating chip is carried by a flexible medium, a chip of a card is coupled, via a card connector, to the contact-less communicating chip, and a microprocessor of a terminal, and the contact-less communicating chip and the terminal microprocessor communicate through the card chip, as an intermediary entity, said method comprising the following steps:
exchanging data between a card chip microprocessor and the contact-less chip by using a first data communication protocol,
exchanging data between the card chip microprocessor and the terminal microprocessor by using a second data communication protocol, and
sending, from the terminal microprocessor, through the card chip, to the contact-less communicating chip, data that is previously encapsulated within first communication protocol data that is itself encapsulated within second communication protocol data.

* * * * *